US006152735A

United States Patent [19]

Meyer

[11] Patent Number: 6,152,735

[45] Date of Patent: Nov. 28, 2000

[54] WHIP ARM MOUNTING FOR DENTAL DELIVERY SYSTEM CONTROL HEAD

[76] Inventor: Thomas C. Meyer, 5 Harbor Park Dr., P.O. Box 1560, Port Washington, N.Y. 11050

[21] Appl. No.: 09/341,214

[22] PCT Filed: Jan. 3, 1997

[86] PCT No.: PCT/US97/00024

§ 371 Date: Nov. 8, 1999

§ 102(e) Date: Nov. 8, 1999

[87] PCT Pub. No.: WO98/29051

PCT Pub. Date: Jul. 9, 1998

[51] Int. Cl.[7] .......... A61C 1/02

[52] U.S. Cl. .......... 433/108

[58] Field of Search .......... 433/28, 98, 108, 433/109; 248/160

[56] References Cited

U.S. PATENT DOCUMENTS

| | | | |
|---|---|---|---|
| 950,768 | 3/1910 | Hammond | 433/109 |
| 4,041,608 | 8/1977 | Lundin | 433/77 |
| 4,863,379 | 9/1989 | Timerdahl et al. | 433/28 |
| 5,017,136 | 5/1991 | Gatti | 433/98 |

*Primary Examiner*—John J. Wilson
*Attorney, Agent, or Firm*—Trask, Britt & Rossa

[57] ABSTRACT

This invention is directed to a whip arm mounting (26) of the European style whip arms on the control head (10) of a dental delivery system, where multiple whip arms (26) are automatically centered and returned to the center rest or storage position without touching the control head cover (12), or the bottom pan (11), and are movable from side to side while carried in a single mounting bracket (50) in the control head.

3 Claims, 7 Drawing Sheets

WHIP ARM MOUNTING FOR DENTAL DELIVERY SYSTEM CONTROL HEAD

BACKGROUND OF THE INVENTION

1. Field of the Invention

This invention relates to mounting of euro type whip arm assemblies in a dental delivery system control head, of the type where the whip arm assemblies are carried in a single bracket mounted to the control head pan, with provisions for automatically centering and returning the whip arms to center rest or storage position.

2. Description of the Prior Art

The control heads of dental delivery systems carry the air, water and vacuum handpieces that the dentist uses in his or her practice.

The conventional or asepsis type of control head has a plurality of holders of semi-circular configuration, into which the handpieces used by the dentist are placed and suspended for storage, and then removed for use and returned for storage. Such handpieces are typically attached to water and air supply lines, and vacuum lines.

The euro style of mounting the handpieces has become more popular as it does not require the dentist to hang up the handpiece in a holder when finished, and is not susceptible to tangled tubings and other problems common to the conventional prior art designs. The euro style structure includes whip arms that are mounted to the control head for each handpiece, which control head contains the tubings that supply air, water, and vacuum. The tubings which are carried by the whip arms rest on the control head cover, and when the dentist needs to use them he or she picks up the handpiece, pulls it to the patient and carries out the procedure. The dentist then places the handpiece on the handpiece pad that is part of the control head, and the whip arms which are resiliently urged to center rest or storage position, rest on the control arm cover for subsequent use as desired.

The prior art whip arms structures relied on the control head cover or bottom pan to interface with each whip arm to return it to its center rest position. The prior art arrangement also caused excessive wear and deterioration of the finish of the control head and whip arm parts.

The whip arm mounting of the invention provides improved centering, return of the whip arms to center rest position, control of the side-to-side movement of the arms and other advantages over the prior art.

SUMMARY OF THE INVENTION

It has now been found that improved mounting of euro style whip arms for dental delivery system control heads is available where the whip arms do not interface with the control head pan or cover, and which are pre-assembled onto a bracket, which is mounted to the control head pan, with the whip arms resiliently urged to center rest position, with controlled side-to-side movement.

The principal object of the invention is to provide improved mounting of euro type whip arm assemblies in a dental system control head.

A further object of the invention is to provide mounting of the character aforesaid which reduces the wear and tear on the arms and the control head.

A further object of the invention is to provide improved mounting of the character aforesaid which is easy to use, and maintain.

A further object of the invention is to provide improved mounting of the character aforesaid which is easy to clean.

A further object of the invention is to provide mounting of the character aforesaid which is simple to construct, and durable in use.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which;

FIG. 2 is a bottom plan view of the structure of FIG. 1

Figure 1:
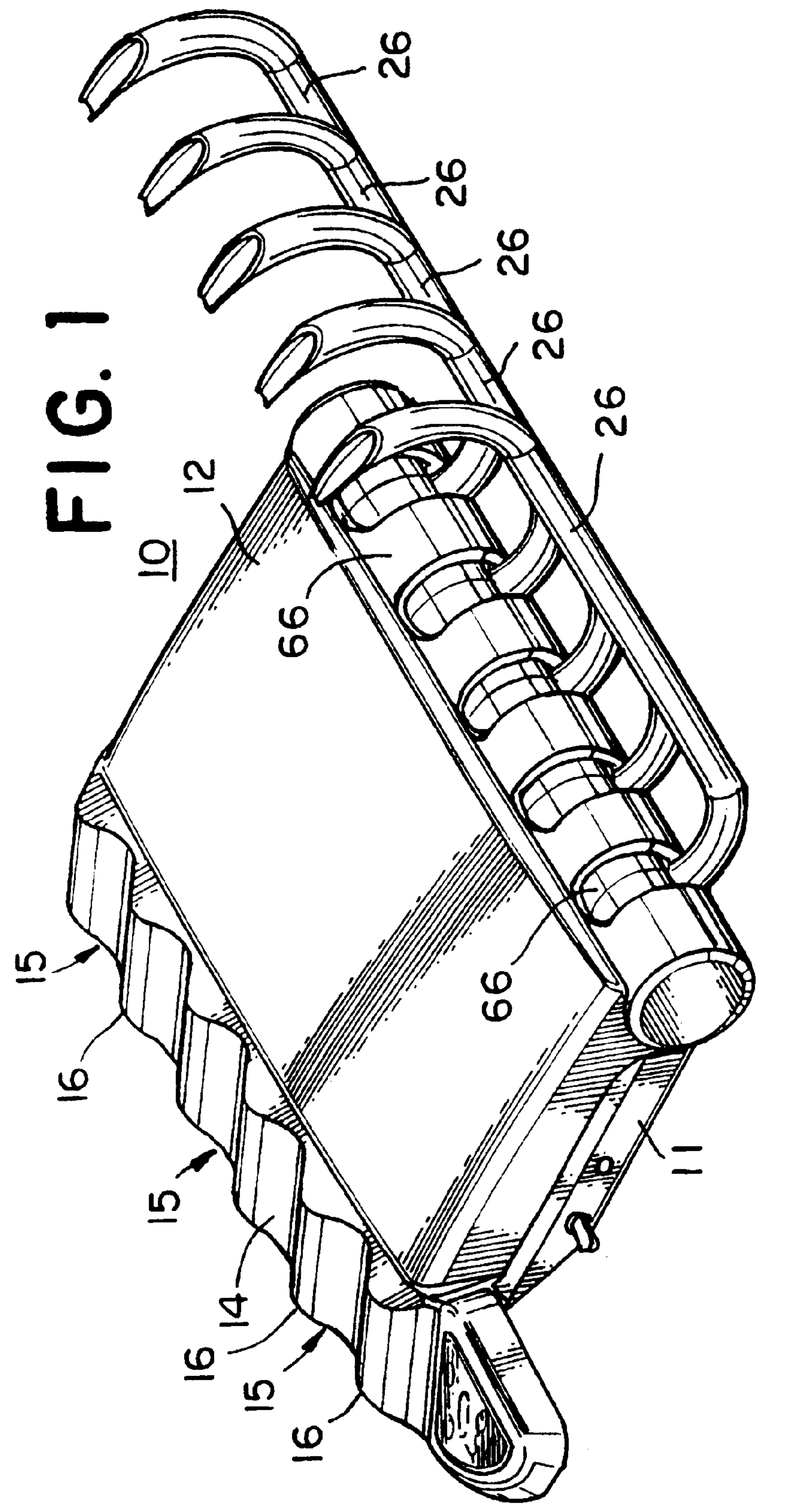
FIG. 1 is a perspective view of the euro style whip arm assemblies of the invention in a control head.
Figure 2:
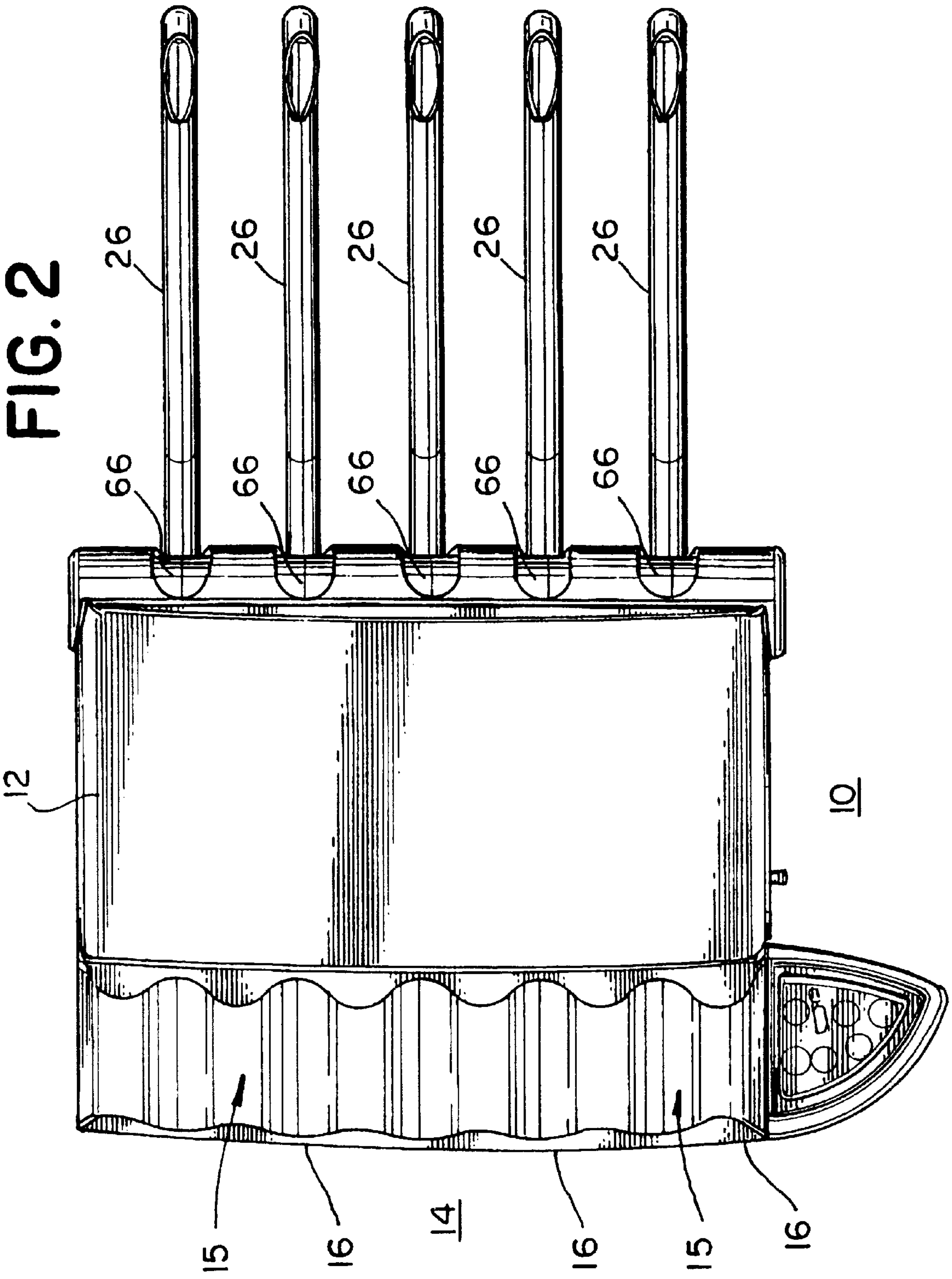
FIG. 2 is a top plan view of the structure of FIG. 1.

It should, of course, be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result.

Referring now more particularly to FIGS. 1–4 of the drawings, an embodiment of mounting the whip arm assemblies in a dental delivery system control head is therein illustrated.

A control head 10 is illustrated, which has a bottom pan 11 and a cover 12 hingedly attached thereto, and which are preferably constructed of aluminum. A handpiece pad 14 is provided mounted to the bottom pan 11 with a plurality of valleys 15, five of which are shown and intended to hold handpieces (not shown), which are separated by ridges 16.

Figure 3:
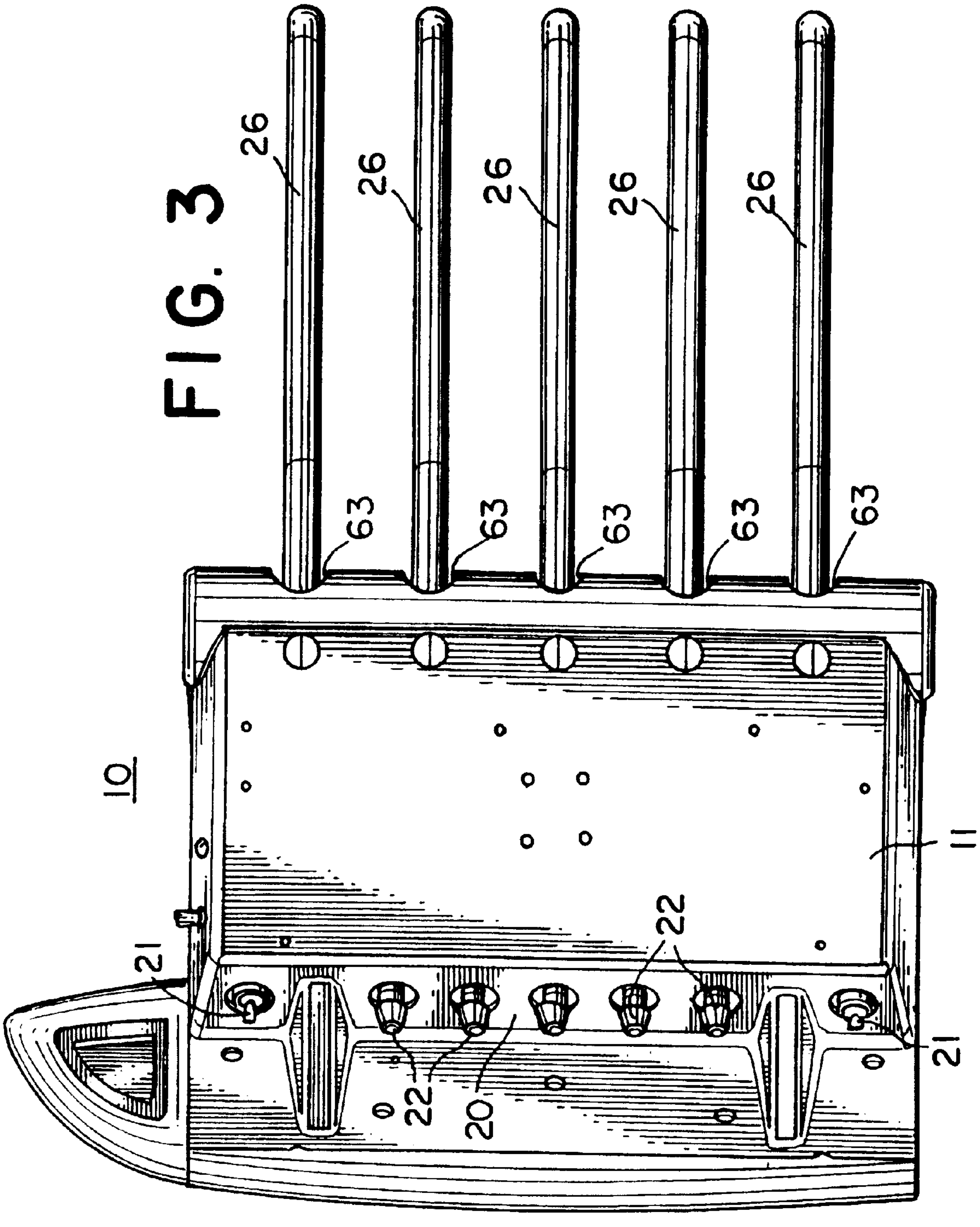
Figure 4:
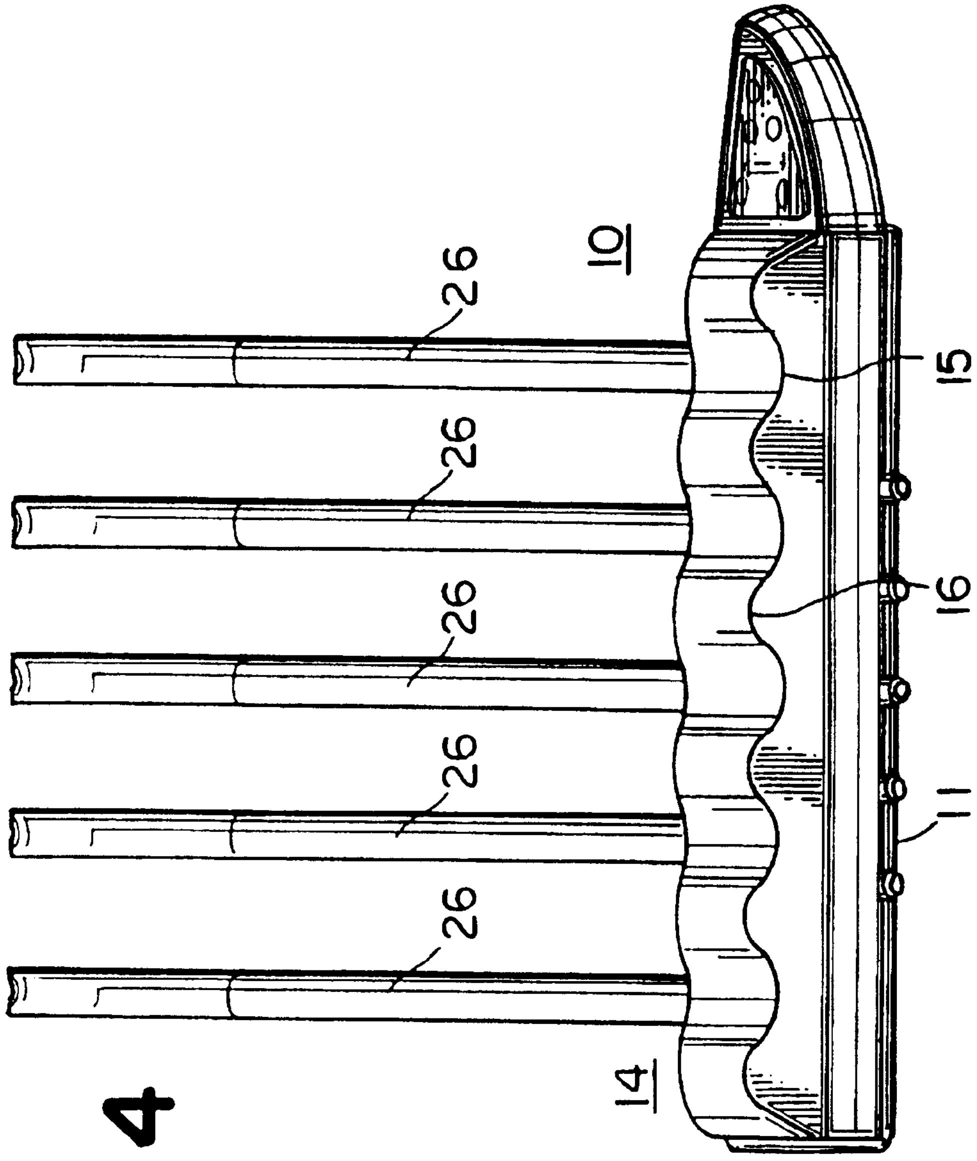
FIG. 4 is a front elevational view of the structure of FIG. 1.

As shown in FIG. 3 the control head 10 has a face 20 on the front of bottom pan 11, with knobs 21 and 22 connected to valves (not shown) to control the flow of air, or water, or the application of vacuum as required by the dentist.

Figure 5:
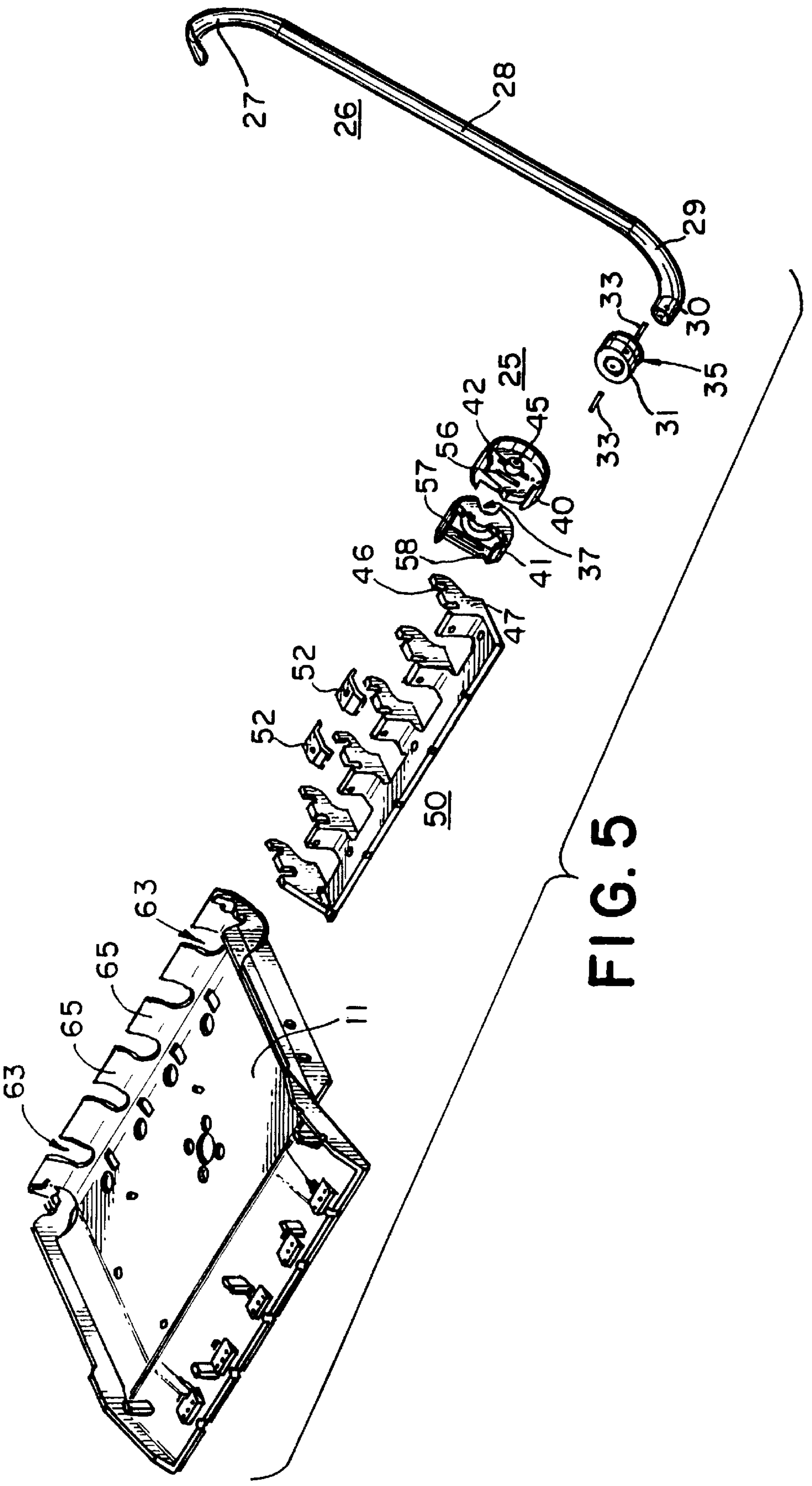
FIG. 5 is an exploded perspective view of the components of the whip arm mounting of the invention.
Figure 6:
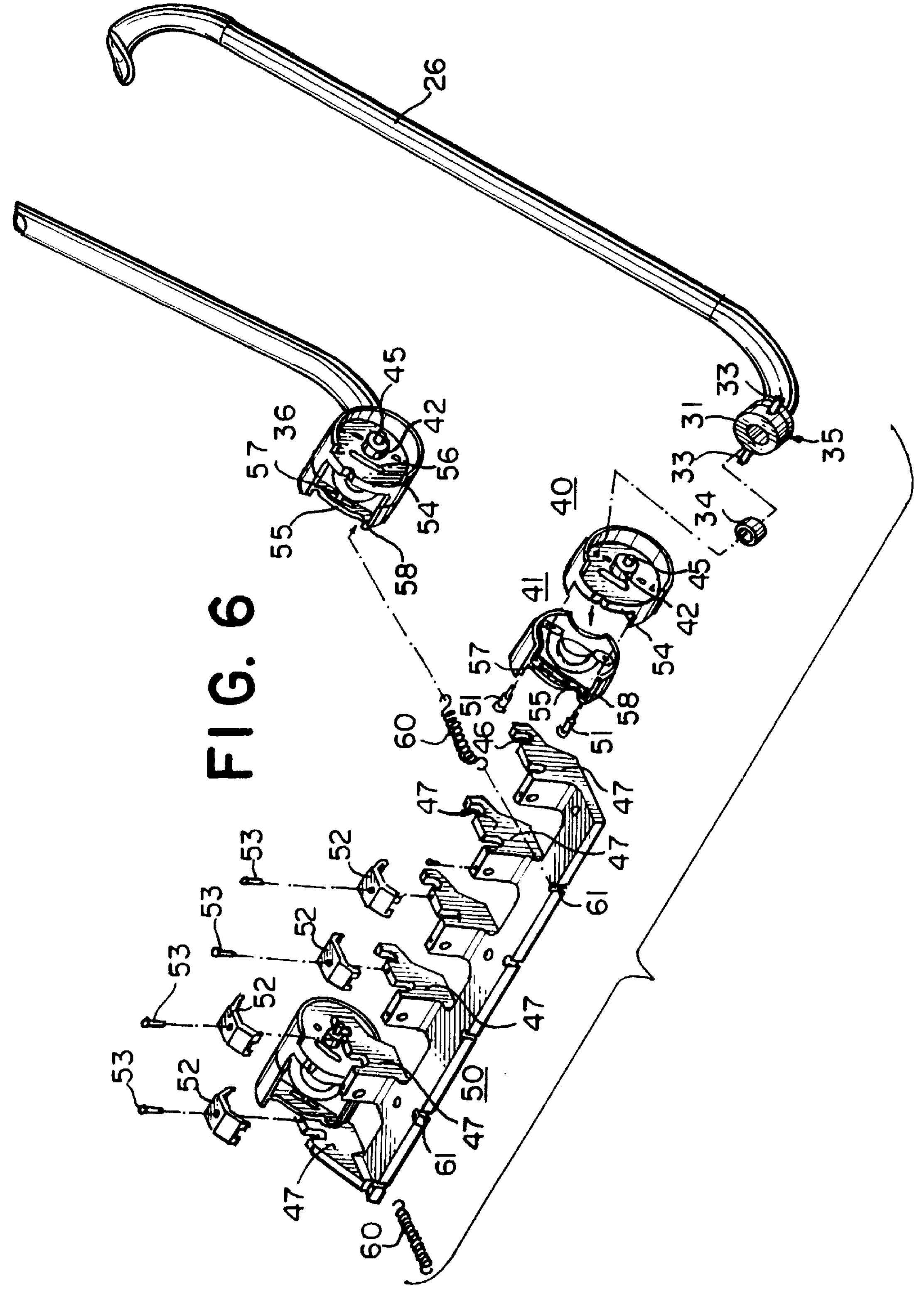
FIG. 6 is a perspective view illustrating the components of the whip arm mounting of the invention.
Figure 7:
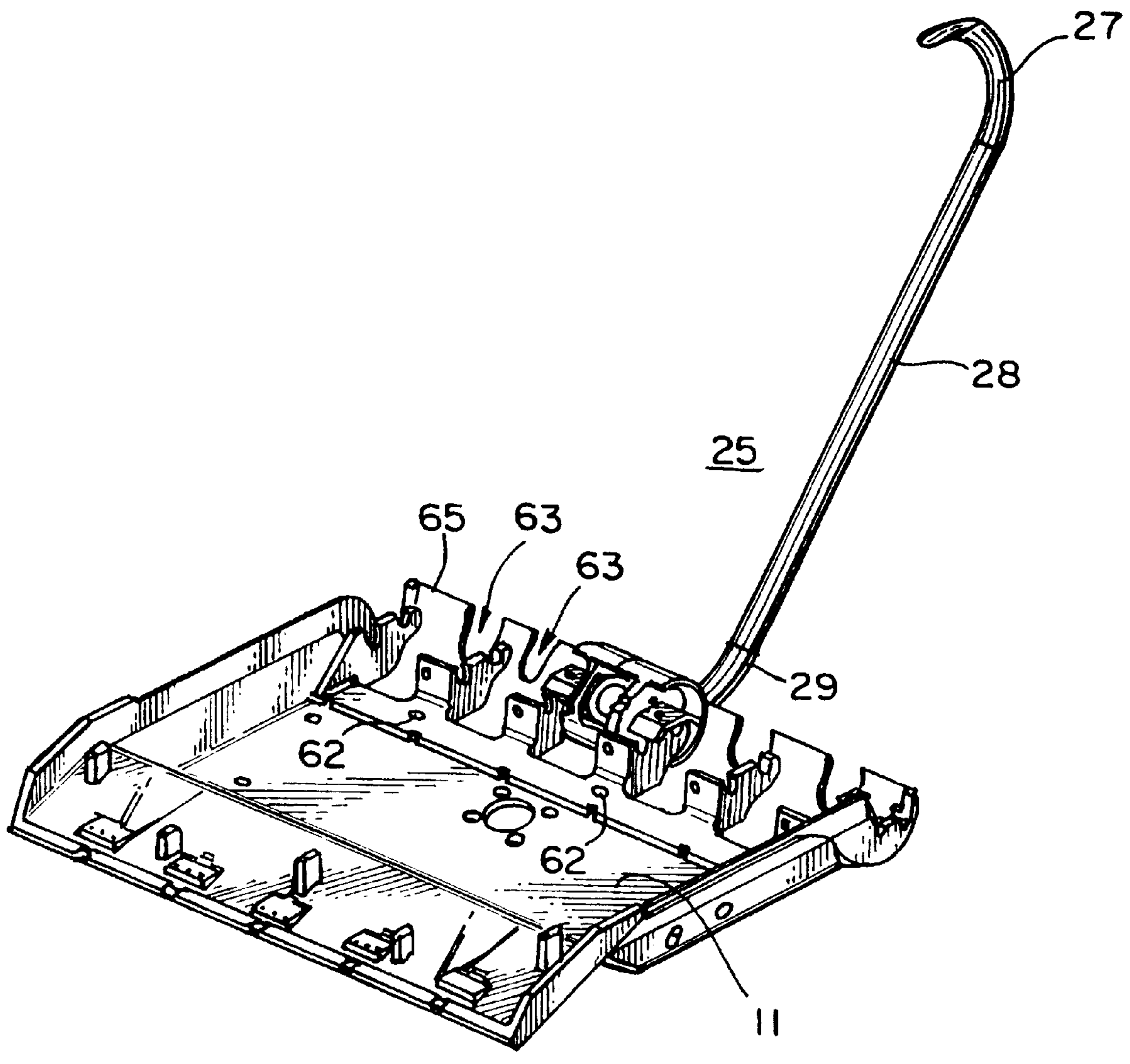
FIG. 7 is a perspective view of the control head of FIG. 1 with the cover removed.

Referring additionally to FIGS. 5–7 the control head 10 carries a plurality of whip arm assemblies 25, of which five are illustrated, but which can be less depending on the requirements of the dentist.

The whip arm assemblies 25 each include a whip arm 26 which is hollow, preferably of extruded aluminum tubing, with a curved exit end 27, a straight center section 28, and a curved entrance end 29. The arms 26 are intended to hold plastic tubing (not shown), which is connected to sources of air, water or vacuum (not shown), by the valves (not shown) which are controlled by knobs 21 or 22.

The whip arms 26 at their entrance ends 29 have straight portions 30, which are engaged in a whip arm bushing 31, which is of cylindrical shape, preferably of aluminum, and with dowel pins 33 therein. A snap in bushing 34 is provided in each whip arm bushing 31, preferably of molded plastic, and which carries the tubing (not shown) which supplies air, water, or vacuum.

The bushings 31 have grooves 35, which are engaged by cutouts 36 and 37 in walls 38 and 39, of a pair of (right and left) whip arm wheels 40 and 41, which are of cylindrical configuration, with stepped center shafts 42, with stub shafts 45 extending therefrom carried in journals 46 of a bracket 50. The whip arm wheels 40 and 41 are preferably of molded plastic, such as thermoplastic polyester.

The whip arm wheels 40 and 41 are retained together by a pair of socket screws 51.

The stub shafts 45 are retained in journals 46 by clips 52, which have cap screws 53 therein engaged in plates 47.

The whip arm wheels 40 and 41 have center walls 54 and 55, with grooves 56 and 57 therein, which are engaged by the dowel pins 33 and limit the side-to-side movement of the arms 26, which are centered and also restrained from movement by contact with the clips 52 while in the center rest position.

The left whip arm wheel 41 has an opening 58 in its center wall 55, which is intended to engage one end of a spring 60, which is also connected to a projection 61 on bracket 50, and urges the wheel 41 in a clockwise direction as seen from the right, to return whip arm 26 to its rearmost position.

The bracket 50 has a plurality of plates 47 for mounting other whip arm assemblies 25 as required.

The bracket 50 is secured to the bottom pan 11 by a plurality of socket screws 62.

The bottom pan 11 has cutouts 63, in its rear wall 65, to accommodate the whip arms 26.

The cover 12 is also provided with a plurality of cutouts 66, to accommodate the whip arms 26, and which match up with the cutouts 63 in bottom pan 11.

The mode of operation will now be pointed out.

The dentist picks up a handpiece (not shown) which is resting in a valley 15 of pad 14, and pulls it toward the patient (not shown), the tubing (not shown) engaged with a whip arm 26, pulls the whip arm 26 forward rotating the whip arm wheels 40 and 41, and stretching spring 60. The dentist adjusts the appropriate knob 21 or 22 for air, water or vacuum, completes the procedure and then returns the handpiece (not shown) to the handpiece pad 14. The spring 60 urges the wheels 40 and 41 to the center rest position and thereby the whip arm 26. If the dentist pulls the handpiece right or left after it has left the initial center rest position, the whip arm bushing 31 may rotate until the dowel pins 33 in grooves 56 and 57 engage the underside of the clips 52 or reach the end of the groove, when further movement is stopped.

When the whip arm 26 moves toward the center rest position the dowel pins 33 engage the clips 52 and bushing 31 is urged to a center position, whereby the whip arms 26 are also urged to a center position and retained therein by pin 33 contact with clips 52.

The operation can continue as required.

It will thus be seen that structure has been provided with which the objects of the invention are achieved.

I claim:

1. In a dental delivery system control head which includes a control head pan and a hinged cover, the improvement for mounting whip arm assemblies therein, which comprises a bracket mounted to said control head pan, said bracket having a plurality of spaced vertically extending plates, said plates having bearing journals therein, a plurality of whip arm assemblies carried in said journals between adjacent plates, said whip arm assemblies each including a pair of wheel means, stub shafts extending from said wheel means carried in said plate journals, a rotatable whip arm bushing carried by said wheel means, said wheel means having center walls with grooves therein, pins in said bushing engaged in said grooves limiting the rotational movement of said bushing, a second bushing fixed in said whip arm bushing, a whip arm carried in said second bushing and which extends rearwardly of said wheel means, cutouts in said cover and said pan through which said whip arm projects, clips on said plates over said journals to retain said stub shafts therein, and to engage said pins to center said whip arm and resilient spring means engaged with said wheel means and said bracket to urge said whip arm to a rest position.

2. A dental delivery system control head as defined in claim 1 in which a handpiece pad is provided attached to said control head pan.

3. A dental delivery system control head as defined in claim 1 in which said whip arm assemblies have tubing therein, which are connected to sources of air, water or vacuum and said tubing has a handpiece on the end thereof.

* * * * *